United States Patent
Ma et al.

(10) Patent No.: US 10,825,151 B2
(45) Date of Patent: Nov. 3, 2020

(54) HEAD UP DISPLAY, DISPLAY METHOD THEREOF AND HEAD UP DISPLAY SYSTEM

(71) Applicant: BOE TECHNOLOGY GROUP CO., LTD., Beijing (CN)

(72) Inventors: Xitong Ma, Beijing (CN); Naifu Wu, Beijing (CN); Xiangyang Liu, Beijing (CN); Rui Sun, Beijing (CN); Lihua Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 306 days.

(21) Appl. No.: 15/939,110

(22) Filed: Mar. 28, 2018

(65) Prior Publication Data

US 2019/0096043 A1 Mar. 28, 2019

(30) Foreign Application Priority Data

Sep. 27, 2017 (CN) .......................... 2017 1 0890975

(51) Int. Cl.
    *H04N 9/31* (2006.01)
    *G02B 27/01* (2006.01)
    (Continued)

(52) U.S. Cl.
    CPC .......... *G06T 5/006* (2013.01); *G02B 27/0172* (2013.01); *G02B 27/286* (2013.01);
    (Continued)

(58) Field of Classification Search
    CPC ............................................. G02B 2027/0141
    See application file for complete search history.

(56) References Cited

U.S. PATENT DOCUMENTS

2012/0224062 A1* 9/2012 Lacoste ................... G06F 3/147
                                                                      348/148
2016/0363764 A1* 12/2016 Ting ........................ G02B 5/30
    (Continued)

FOREIGN PATENT DOCUMENTS

| CN | 105700136 A | 6/2016 |
|---|---|---|
| CN | 105791786 A | 7/2016 |

(Continued)

OTHER PUBLICATIONS

English translation of CN-105791786-A (Year: 2016).*
Office Action issued in corresponding Chinese Patent Application No. 201710890975.X, dated May 22, 2019.

*Primary Examiner* — Alison Slater
(74) *Attorney, Agent, or Firm* — Michael E. Fogarty

(57) ABSTRACT

A head up display includes: a display source configured to project a correction image and a corrected driving information image onto a transflective component; a polarization controller configured to control a polarization direction of light emitted from the display source; a receiver configured to receive a distorted correction image displayed on the transflective component; and a processor connected with the receiver, and configured to compare the distorted correction image received by the receiver with a correction image pre-stored in the processor to obtain a first image distortion, and to correct a driving information image to be displayed according to the first image distortion to obtain the corrected driving information image.

14 Claims, 4 Drawing Sheets

(51) Int. Cl.
*G02B 5/30* (2006.01)
*B60K 35/00* (2006.01)
*G02B 27/28* (2006.01)
*G02F 1/1335* (2006.01)
*G06T 5/00* (2006.01)
*G06T 3/00* (2006.01)
*H04N 5/74* (2006.01)
*H04N 5/225* (2006.01)
*H04N 17/04* (2006.01)

(52) U.S. Cl.
CPC ........... *G06T 3/005* (2013.01); *H04N 5/7491* (2013.01); *H04N 9/3167* (2013.01); *H04N 9/3185* (2013.01); *H04N 9/3194* (2013.01); *G02B 2027/011* (2013.01); *G02B 2027/014* (2013.01); *G02B 2027/0138* (2013.01); *G06T 2207/30268* (2013.01); *H04N 5/2254* (2013.01); *H04N 17/04* (2013.01)

(56) References Cited

U.S. PATENT DOCUMENTS

2018/0157066 A1* 6/2018 Waltermann ........... G02C 7/101
2019/0129172 A1* 5/2019 Misawa ................ H05K 7/2039

FOREIGN PATENT DOCUMENTS

| CN | 205787364 U | 12/2016 |
| EP | 0682281 A1 | 11/1995 |
| JP | 2010125910 A | 6/2010 |

\* cited by examiner

HEAD UP DISPLAY, DISPLAY METHOD THEREOF AND HEAD UP DISPLAY SYSTEM

CROSS REFERENCE OF RELATED APPLICATIONS

The application claims priority to Chinese Patent Application No. 201710890975.X, filed on Sep. 27, 2017, titled "A HEAD UP DISPLAY, HEAD UP DISPLAY SYSTEM, DISPLAY METHOD THEREOF AND CAR", which is incorporated herein by reference in its entirety.

TECHNICAL FIELD

The present disclosure relates to the technical field of display, and more particularly, to a head up display, a display method thereof and a head up display system.

BACKGROUND

A HUD (Head Up Display) originally appeared in a military aircraft, and is used to project related flight information onto a forward glass of the aircraft, so that a pilot does not need to look down at an instrument and always keeps his/her head up, thereby enhancing flying safety. With the development of the electronic information technology, the head up technology is gradually applied to a car.

SUMMARY

According to some embodiments of the present disclosure, a head up display is provided, which includes: a display source configured to project a correction image and a corrected driving information image onto a transflective component at different times; a polarization controller configured to control a polarization direction of light emitted from the display source; a receiver configured to receive a distorted correction image displayed on the transflective component; and a processor configured to compare the distorted correction image received by the receiver with a reference image pre-stored in the processor to obtain a first image distortion, and to correct a driving information image to be displayed according to the first image distortion to obtain a corrected driving information image.

In some embodiments of the present disclosure, the polarization controller is configured to control the polarization direction of light emitted from the display source as a first polarization direction while the display source projects a correction image onto the transflective component; and to control the polarization direction of light emitted from the display source as a second polarization direction while the display source projects a corrected driving information image onto the transflective component, wherein, the first polarization direction is perpendicular to the second polarization direction.

In some embodiments of the present disclosure, the correction image is a correction grid image.

In some embodiments of the present disclosure, the display source is configured to project images at N frames per second, wherein, N−1 images of the images are driving information images, and one image is the correction image, where N is an integer greater than 1.

In some embodiments of the present disclosure, the first image distortion is a maximum value of offsets of pixel points in the distorted correction image displayed on the transflective component relative to corresponding pixel points in the reference image pre-stored in a row direction.

In some embodiments of the present disclosure, the processor is configured to obtain a first correction parameter $k_1$ corresponding to the first image distortion; to obtain a coordinate correspondence according to the first correction parameter $k_1$, wherein the coordinate correspondence is used to indicate a second coordinate (x', y') which is corresponding to a first coordinate (x, y), the first coordinate (x, y) is a coordinate of any pixel point in the driving information image to be displayed, $$x' = \frac{x}{1+k_1 y}(1+k_1 y_{max}),$$

y'=y, and $y_{max}$ is a height of the driving information image to be displayed; and to adjust a pixel value at the first coordinate (x, y) in the driving information image to be displayed into a pixel value at the second coordinate (x', y') to obtain the corrected driving information image.

In some embodiments of the present disclosure, the processor is configured to obtain an abscissa correspondence according to a second correction parameter $k_2$, wherein the abscissa correspondence is used to indicate a second abscissa x" which is corresponding to a first abscissa x, the first abscissa x is an abscissa of any pixel point in the driving information image to be displayed, $$x'' = \frac{x}{1+k_2 y}(1+k_2 y_{max});$$

to obtain a second image distortion according to the first abscissa x and the second abscissa x"; set the first correction parameter k1 to equal the second correction parameter k2 if a difference between the first image distortion and the second image distortion is less than or equal to a threshold; and to adjust the second correction parameter k2 as an adjusted second correction parameter and, and return to obtain the abscissa correspondence according to the adjusted second correction parameter if the difference between the first image distortion and the second image distortion is greater than the threshold.

According to some embodiments of the present disclosure, a head up display system is provided, which includes a wearable device and the head up display described in the above embodiments; the wearable device includes a polarized camera, a transmitter and at least one polarized lens, and a polarized transmissive axis of the polarized camera is perpendicular to a polarized transmissive axis of each of the at least one polarized lens; the polarized camera is configured to acquire a distorted correction image displayed on the transflective component; and the transmitter is configured to transmit the distorted correction image acquired by the polarized camera to a receiver of the head up display. In the head up display, a polarization controller is configured to: control a polarization direction of light emitted from the display source to be parallel to the polarized transmissive axis of each of the at least one polarized lens when the display source projects a driving information image; and control a polarization direction of light emitted from the display source to be parallel to the polarized transmissive axis of the polarized camera when the display source projects a correction image.

In some embodiments of the present disclosure, the polarized camera includes a camera lens and a polarizer affixed to the camera lens.

In some embodiments of the present disclosure, the polarized camera includes a camera lens, and an outermost lens, which is used to acquire an image, of the camera lens is polarizer.

In some embodiments of the present disclosure, the at least one polarized lenses comprises two polarized lenses, and the polarized camera is located in an intermediate location between the two polarized lenses.

According to some embodiments of the present disclosure, a display method of the head up display is provided, which includes: projecting a correction image onto a transflective component; acquiring a distorted correction image displayed on the transflective component; comparing the distorted correction image displayed on the transflective component and required with a reference image pre-stored in the processor to obtain a first image distortion; correcting a driving information image to be displayed according to the first image distortion to obtain a corrected driving information image; and projecting the corrected driving information image onto the transflective component.

In some embodiments of the present disclosure, the first image distortion is a maximum value of offsets of pixel points in the distorted correction image displayed on the transflective component relative to corresponding pixel points in the reference image pre-stored in a row direction.

In some embodiments of the present disclosure, correcting a driving information image to be displayed according to the first image distortion to obtain a corrected driving information image, includes: obtaining a first correction parameter $k_1$ corresponding to the first image distortion; obtaining a coordinate correspondence according to the first correction parameter $k_1$, wherein the coordinate correspondence is used to indicate a second coordinate (x', y') which is corresponding to a first coordinate (x, y), the first coordinate (x, y) is a coordinate of any pixel point in the driving information image to be displayed, $$x' = \frac{x}{1+k_1 y}(1+k_1 y_{max}),$$

y'=y, and $y_{max}$ is a height of the driving information image to be displayed; and adjusting a pixel value at the first coordinate (x, y) in the driving information image to be displayed to a pixel value at the second coordinate (x', y') to obtain the corrected driving information image.

In some embodiments of the present disclosure, obtaining the first correction parameter k1 corresponding to the first image distortion includes: obtaining an abscissa correspondence according to a second correction parameter k2, wherein the abscissa correspondence is used to indicate a second abscissa x" which is corresponding to a first abscissa x, the first abscissa x is an abscissa of any pixel point in the driving information image to be displayed, $$x'' = \frac{x}{1+k_2 y}(1+k_2 y_{max});$$

obtaining a second image distortion according to the first abscissa x and the second abscissa x"; setting the first correction parameter k1 to equal the second correction parameter k2 if a difference between the first image distortion and the second image distortion is less than or equal to a threshold; and adjusting the second correction parameter k2 as an adjusted second correction parameter and returning to obtain the abscissa correspondence according to the adjusted second correction parameter if the difference between the first image distortion and the second image distortion is greater than the threshold.

DESCRIPTION OF THE DRAWINGS

In order to describe the technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Driving information images displayed by a display source are usually projected onto a front windshield of a car by a head up display, and then enter human eyes through a reflection of the front windshield. However, the inventors noticed that an image seen by a driver is partially distorted comparing with the image pre-stored in the head up display because of the impact of lenses in the front windshield and the head up display. In addition, the inventors also noticed that different positions or different viewing angles of the driver also cause the distortion of the image seen by the driver. However, due to the distortion of the image seen by the driver, the viewing for the image may be affected.

Figure 1:
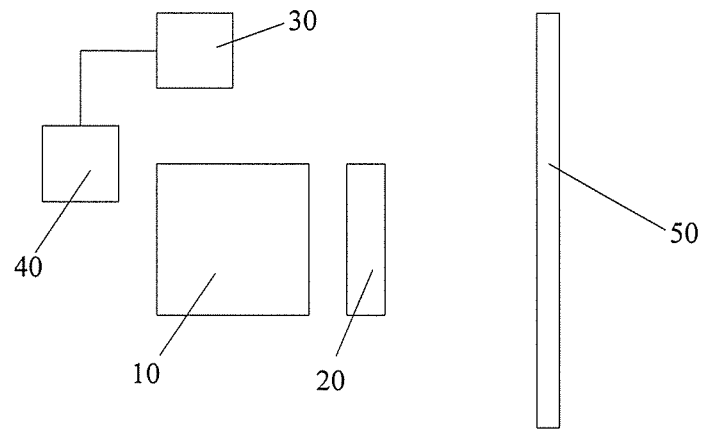
FIG. 1 is a structure diagram of a head up display provided by some embodiments of the present disclosure.
Figure 2A:
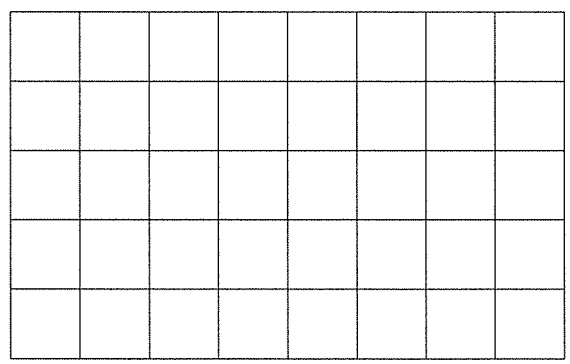
FIG. 2(a) is a structure diagram of a correction grid image provided by some embodiments of the present disclosure.
Figure 2B:
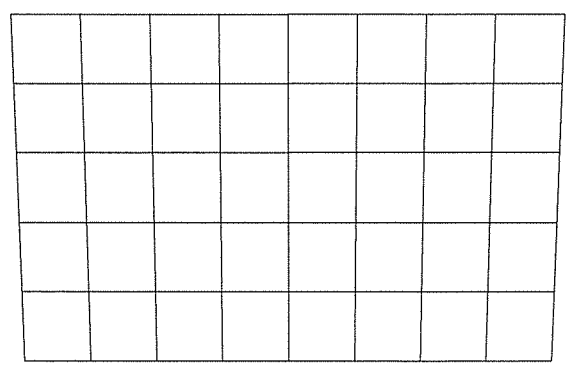
FIG. 2(b) is a diagram of a distorted correction grid image provided by some embodiments of the present disclosure.
Figure 2C:
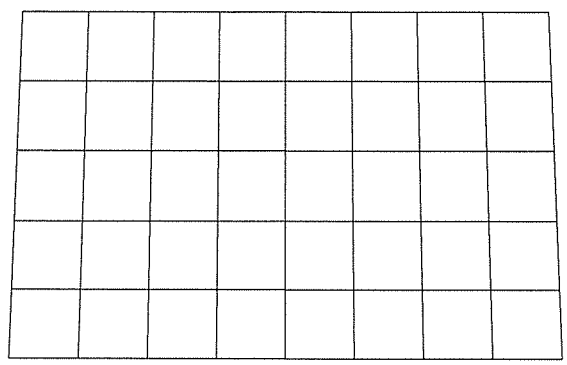
FIG. 2(c) is a diagram of a corrected correction grid image provided by some embodiments of the present disclosure.

In order to improve the viewing for the image, some embodiments of the present disclosure provide a head up display. As shown in FIG. 1, the head up display includes a display source 10, a polarization controller 20, a receiver 30 and a processor 40 connected with the receiver 30. The display source 10 is configured to project a correction image and a corrected driving information image onto a transflective component 50 at different times. The polarization controller 20 is configured to control a polarization direction of light emitted from the display source 10. The receiver 30 is configured to receive a distorted correction image displayed on the transflective component 50. The processor 40 is configured to compare the distorted correction image received by the receiver 30 with a reference image pre-stored in the processor 40 to obtain a first image distortion, and configured to correct a driving information image to be displayed according to the first image distortion to obtain the corrected driving information image.

In some embodiments, the display source 10 includes a display and a projection device, and an image displayed by the display is projected onto the transflective component 50 by the projection device. In some other embodiments, the display source 10 includes an information storing device and a projection device, and information stored in the information storing device is projected on the transflective component 50 by the projection device. In some other embodiments, the display source 10 is any other type of display source.

In some embodiments, the transflective component 50 is a front windshield of a car or an aircraft. In some other embodiments, the transflective component 50 is a projection plank that comes with the head up display.

In some embodiments, the display source 10 projects the correction image and the corrected driving information image onto the transflective component 50 at different times, and a time interval between a time point when the correction image is projected and a time point when the corrected driving information image is projected is set according to the need, and is not limited.

It will be noted that in some embodiments, the process that the receiver 30 receives the distorted correction image displayed on the transflective component 50 includes a process that the distorted correction image displayed on the transflective component 50 is firstly acquired by a device other than the receiver 30, such as a camera, and a process that the distorted correction image acquired by the device is transmitted to the receiver 30, so that the receiver 30 receives the distorted correction image displayed on the transflective component 50. In some embodiments, the device is a camera. In some embodiments, a transmitter is integrated in the camera. If the camera acquires, as an acquired distorted correction image, the distorted correction image displayed on the transflective component 50, the transmitter emits the acquired distorted correction image to the receiver 30. In some other embodiments, in addition to the camera, an individual transmitter is provided, the camera transmits the acquired distorted correction image to the transmitter, and then the transmitter transmits the acquired distorted correction image to the receiver 30.

In some embodiments, the correction image is an arbitrary image, such as, a landscape painting or a grid image. In some other embodiments, the correction image is a correction grid image. In this manner, it is easy to compare the distorted correction image received by the receiver 30 with the reference image pre-stored in the processor 40 to obtain the first image distortion, after the display source 10 projects the correction image onto the transflective component 50.

In some embodiments, as the polarization controller 20 is used to control the polarization direction of the light emitted from the display source 10, the polarization controller 20 is provided at a light emergent side of the display source 10. In some examples, the polarization controller 20 is provided at a light emergent side of the projection device.

In the embodiments of the present disclosure, the display source 10 is configured to project the correction image and the corrected driving information image onto the transflective component 50 at different times. The driving information image is aim to facilitate a driver to see the driving information, and thus the driving information image needs to enter the driver's eyes. The correction image is used to correct the driving information image, and thus it does not need to enter the driver's eyes. Therefore, the correction image is prevented from entering the driver's eyes when the display source 10 projects the correction image onto the transflective component 50, so as to prevent the correction image from affecting the viewing for the driving information image.

Base on this, in some embodiments of the present disclosure, the polarization controller 20 controls the polarization direction of the light emitted from the display source 10 as a first polarization direction when the display source 10 projects the correction image onto the transflective component 50. In addition, the polarization controller 20 controls the polarization direction of the light emitted from the display source 10 as a second polarization direction when the display source 10 projects the corrected driving information image onto the transflective component 50. The first polarization direction is perpendicular to the second polarization direction.

Figure 3:
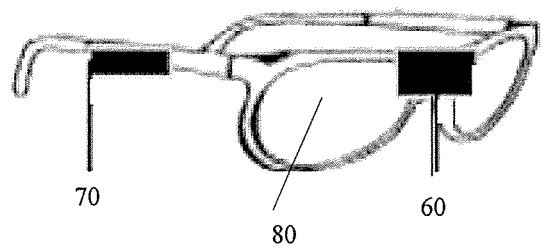
FIG. 3(a) is a structure diagram of a wearable device provided by some embodiments of the present disclosure.
FIG. 3(b) is a diagram of a polarization direction of light emitted from a display source controlled by the polarization controller to be parallel to the polarized transmissive axis of each of the at least one the polarized lens.
FIG. 3(c) is a diagram of a polarization direction of light emitted from the display source controlled by the polarization controller to be parallel to the polarized transmissive axis of the polarized camera.

As the polarization controller 20 controls the polarization direction of the light emitted from the display source 10 as the first polarization direction when the display source 10 projects the correction image onto the transflective component 50, if only the light, a polarization of which is the second polarization direction, is allowed to pass through lenses worn by the driver, the driver cannot see the correction image. In addition, if the light, a polarization direction of which is the first polarization direction, is allowed to pass through a device used to acquire the image, such as a camera, the camera can acquire the correction image. In addition, the polarization controller 20 controls the polarization direction of the light emitted from the display source 10 as the second polarization direction when the display source 10 projects the corrected driving information image onto the transflective component 50. As only the light, the polarization direction of which is the second polarization direction, is allowed to pass through the lenses worn by the driver, the driver can see the corrected driving information image. As only the light, the polarization direction of which is the first polarization direction, is allowed to pass through a device used to acquire the image, such as a camera, the camera cannot acquire the driving information image. In this way, not only the viewing for the driving information image is not affected, but also the correction image displayed on the transflective component 50 can be acquired. Here, as shown in FIGS. 3(*b*)-3(*c*), when the display source 10 projects the correction image and the corrected driving information image onto the transflective component 50, the polarization directions of the polarized light emitted from the display source 10 are perpendicular to each other, and thus two paths of the light will not affect each other.

In some embodiments, the processor 40 is a CPU (Central Processing Unit), a MCU (Microcontroller Unit), etc. The type of the processor 40 is not limited. In addition, in some embodiments, the head up display also includes a memory used to pre-store the correction image. In this case, the processor 40 acquires the correction image from the memory, and compares the distorted correction image with the correction image. The memory is for example RAM, ROM, CACHE, or the like.

In some embodiments of the present disclosure, the processes for correcting the driving information image are as followings:

Referring to FIGS. 2(*a*) to 2(*c*), FIG. 2(*a*) is a reference image pre-stored in the processor 40 (the correction image being a correction grid image is taken as an example for illustration), and FIG. 2(*b*) is a distorted correction image displayed on the transflective component 50 and received by the receiver 30 after the display source 10 projects the reference image pre-stored in the processor 40 onto the transflective component 50. Due to effects of lenses of the windshield and display source 10, and the position and viewing angle of the driver, as shown in FIG. 2(*b*), a distorted correction image is displayed on the transflective component 50 and received by the receiver 30. The processor 40 compares the distorted correction image received by the receiver 30 on the transflective component 50 as shown in FIG. 2(*d*) with the reference image pre-stored in the processor 40 to obtain a first image distortion, and adjusts the driving information image to be displayed according to first image distortion to obtain the corrected driving information image as shown in FIG. 2(*c*). Here, for the convenience of comparison, in FIG. 2(*c*), the corrected driving information image is represented by using the corrected grid image. When the display source 10 projects the corrected driving information image as shown in FIG. 2(*c*) onto the transflective component 50, a distortionless driving information image as shown in FIG. 2(*a*) is displayed on the transflective component 50. FIG. 2(*e*) shows the corrected driving information image displayed on the transflective component 50.

In the head up display provided in the embodiments of the present disclosure, when the head up display is used in combination with a polarized camera and polarized lenses, the display source 10 of the head up display projects the correction image and corrected driving information image onto the transflective component 50 at different times, and the polarization controller 20 can control a polarization direction of the light emitted from the display source 10. In addition, when the display source 10 projects the correction image onto the transflective component 50, the polarization controller 20 controls the polarization direction of the light emitted from the display source 10 to be the same as a polarization direction of polarized light allowed to pass through the polarized camera, and to be perpendicular to a polarization direction of polarized light allowed to pass through the polarized lens. Therefore, only the polarized camera can acquire the distorted correction image displayed on the transflective component 50, and then the polarized camera transmits the acquired distorted correction image to the receiver 30 of the head up display. In turn, the receiver 30 transmits the acquired distorted correction image to the processor 40, and the processor 40 compares the acquired distorted correction image with the reference image pre-stored in the processor 40 to obtain a first image distortion. In addition, the processor 40 corrects the driving information image to be displayed according to the first image distortion, to obtain the corrected driving information image.

When the display source 10 projects the driving information image, the polarization controller 20 controls the polarization direction of the light emitted from the display source 10 to be parallel to the polarization direction of polarized light which is allowed to pass through the polarized lens worn by the driver, so the driver can see the driving information image through the polarized lens. As the driving information image has been corrected, the corrected driving information image seen by the driver is a distortionless image, and thus the viewing effect cannot be affected.

If a frequency of projecting the correction image by the display source 10 is too high, the viewing for the driving information image may be affected. In addition, if the frequency of projecting the correction image by the display source 10 is too low, the corrected driving information image seen by the driver may also have distortion because of a change of the viewing angle and/or position of the driver, and thus the correction cannot be realized in real time. Based on this, in some embodiments of the present disclosure, the display source 10 is configured to project images at N frames per second, N-1 images of which are driving information images and one image is the correction image.

N is not limited and is related to ability of the display source 10 to project images. In some embodiments, N is 60, that is, the display source 10 projects images at 60 frames per second, 59 images of which are driving information images, and one image is the correction image.

When the display source 10 is configured to project images at N frames per second, N−1 image of which are the driving information images and one image is the correction image, the viewing for the driving information image may not be affected, and it may be ensured that the head up display corrects the driving information images in real time, so the driving information images seen by the driver are distortionless images.

In the embodiment of the present disclosure, the processor 40 is configured to compare the distorted correction image received by the receiver 30 with the reference image pre-stored in the processor 40 to obtain the first image distortion d. The first image distortion d is not limited. In some embodiments, the first image distortion d is an average value of offsets of pixel points in the distorted correction image displayed on the transflective component 50 relative to corresponding pixel points in the reference image pre-stored in a row direction. In some other embodiments, the first image distortion d is a maximum value of offsets of pixel points in the distorted correction image displayed on the transflective component relative to corresponding pixel points in the reference image pre-stored in a row direction. In this manner, it may be ensured that the distortion of the corrected driving information image is as small as possible.

It will be noted that the image projected onto the transflective component 50 by the display source 10 usually has a larger distortion in its edge position, so in some embodiments of the present disclosure, in order to reduce the workload of the processor 40 and improve the efficiency of the processor 40, there is no need to calculate the offsets of all the pixel points in the image in the row direction. In some embodiments, only the offsets of the pixel points located at the edge of the image in the row direction are calculated. A maximum value of offsets of the pixel points located at the edge of the image in the row direction is obtained as the first image distortion d, by comparing the offsets of the pixel points located at the edge of the image in the row direction.

In some embodiments of the present disclosure, the processor 40 is configured to obtain a first correction parameter $k_1$ corresponding to the first image distortion d, and to obtain a coordinate correspondence according to the first correction parameter $k_1$. The coordinate correspondence is used to indicate a second coordinate (x', y') corresponding to a first coordinate (x, y), and the first coordinate (x, y) is a coordinate of any pixel point in a driving information image to be displayed, where $$x' = \frac{x}{1+k_1 y}(1+k_1 y_{max}),$$

y'=y, and $y_{max}$ is a height of the driving information image to be displayed. In addition, the processor 40 is configured to change a pixel value at the first coordinate (x, y) in the driving information image to be displayed to a pixel value at the second coordinate (x', y') to obtain the corrected driving information image.

In some embodiments, the first correction parameter $k_1$ corresponding to the first image distortion d is pre-stored in the processor 40. After the first image distortion d is obtained, the corresponding first correction parameter $k_1$ is found according to the first image distortion d. For example, as shown in Table 1, if the first image distortion d is 0.1, the corresponding first correction parameter $k_1$ obtained according to the first image distortion d is 0.3. In some other embodiments, after the first image distortion d is obtained, the first correction parameter $k_1$ corresponding to the first image distortion d is calculated according to the first image distortion d. The method for calculating the first correction parameter is not limited.

TABLE 1

| first image distortion d | first correction parameter $k_1$ |
|---|---|
| 0.1 | 0.3 |
| 0.2 | 0.5 |
| 0.3 | 0.7 |
| ... | ... |

It will be noted that after the first correction parameter $k_1$ is obtained, the second coordinate (x', y') corresponding to the first coordinate (x, y) of each pixel point in the driving information image to be displayed is calculated according to the formulas $$x' = \frac{x}{1+k_1 y}(1+k_1 y_{max})$$

and y'=y, and then the corrected driving information image is obtained by changing the pixel value of each pixel point at the first coordinate (x, y) in the driving information image to be displayed to the pixel value of a corresponding pixel point at the second coordinate (x', y'). For example, if according to the calculation formulas, a second coordinate corresponding to the pixel point at the first coordinate (1, 2) is calculated to be (1, 3) and a second coordinate corresponding to the pixel point at the first coordinate (2, 2) is calculated to be (2, 3), then the pixel value of the pixel point at the coordinate (1, 2) in the driving information image to be displayed is changed to that of the pixel point at the coordinate (1, 3), and the pixel value of the pixel point at the coordinate (2, 2) in the driving information image to be displayed is changed to that of the pixel point of the coordinate (2, 3).

Where, $y_{max}$ is the height of the driving information image to be displayed. If the resolution of the driving information image to be displayed is 800*500, the height of the driving information image to be displayed is 800.

In some embodiments, after the first image distortion d is obtained, the way to obtain the first correction parameter k1 according to the first image distortion d is as follows. The processor 40 is configured to obtain an abscissa correspondence according to a second correction parameter k2. The abscissa correspondence is used to indicate a second abscissa x" corresponding to a first abscissa x, and the first abscissa x is an abscissa of any pixel point in the driving information image to be displayed:

$$x'' = \frac{x}{1+k_2 y}(1+k_2 y_{max}).$$

In addition, the processor 40 is configured to obtain a second image distortion p according to the first abscissa x and the second abscissa x". In addition, the processor 40 is configured to set the first correction parameter k1 equal the second correction parameter k2 if an absolute value of a difference between the first image distortion d and the second image distortion p is less than or equal to a threshold, and, if the absolute value is greater than the threshold, to adjust the second correction parameter k2 and return to obtain the abscissa correspondence according to the adjusted second correction parameter k2 until that the absolute value of the difference between the first image distortion d and the second image distortion p is less than or equal to the threshold and the first correction parameter k1 is obtained.

An initial value of the second correction parameter $k_2$ is not limited, and is set according to actual conditions. For example, the initial value of the second correction parameter $k_2$ is 0.1, 0.2, etc.

In some embodiments, the second image distortion p is an average value of the absolute values of the differences between the first abscissas x of pixel points in the driving information image to be displayed and the second abscissas x" corresponding to the first abscissas x. In some other embodiments, the second image distortion p is a maximum value of the absolute values of the differences between the first abscissas x of pixel points in the driving information image to be displayed and the second abscissas x" corresponding to the first abscissas x, that is, p=max{|x−x"|}.

As the first image distortion d needs to be compared with the second image distortion p, in some embodiments, if the first image distortion d is an average of offsets of pixel points in the distorted correction image displayed on the transflective component 50 relative to corresponding pixel points in the reference image pre-stored in a row direction, the second image distortion p is an average value of the absolute values of the differences between the first abscissas x of pixel points in the driving information image to be displayed and the second abscissas x" corresponding to the first abscissas x. In addition, if the first image distortion d is a maximum value of offsets of pixel points in the distorted correction image displayed on the transflective component 50 relative to corresponding pixel points in the reference image pre-stored in a row direction, the second image distortion p is a maximum value of the absolute values of the differences between the first abscissas x of pixel points in the driving information image to be displayed and the second abscissas x" corresponding to the first abscissas x.

The situation that the first correction parameter k1 is set to equal the second correction parameter k2 if the absolute value of the difference between the first image distortion d and the second image distortion p is less than or equal to a threshold includes the following situation. In some embodiments, if the absolute value of the difference between the first image distortion d and the second image distortion p is smaller than the threshold, the first correction parameter k1 is equal to the second correction parameter k2, and if the absolute value is greater than or equal to the threshold, the second correction parameter k2 is adjusted as an adjusted second correction parameter, and the process is returned to obtain the abscissa correspondence according to the adjusted second correction parameter. In some other embodiments, if the absolute value of the difference between the first image distortion d and the second image distortion p is equal to the threshold, the first correction parameter k1 is set equal the second correction parameter k2, and if the absolute value is not equal to the threshold, the second correction parameter k2 is adjusted as an adjusted second correction parameter, and the process is returned to obtain the abscissa correspondence according to the adjusted second correction parameter. In still other embodiments, if an absolute value of the difference between the first image distortion d and the second image distortion p is less than or equal to a threshold, the first correction parameter k1 is set to equal the second correction parameter k2, and if the absolute value is greater than the threshold, the second correction parameter k2 is adjusted as an adjusted second correction parameter, and the process is returned to obtain the abscissa correspondence according to the adjusted second correction parameter.

The threshold described above is not limited. In some embodiments, the threshold is an arbitrary number. In some other embodiments, the threshold is zero. When the threshold is equal to zero, namely, the difference between the first image distortion d and the second image distortion p is equal to zero, the first correction parameter k1 is equal to the second correction parameter k2, and if the threshold is not equal to zero, the second correction parameter k2 is adjusted as an adjusted second correction parameter, and the process is returned to obtain the abscissa correspondence according to the adjusted second correction parameter.

As the larger the value of the second correction parameter k2, the larger the second image distortion p, in some embodiments, the second correction parameter k2 is adjusted through a feedback according to the difference between the first image distortion d and the second image distortion p. When the second image distortion p is larger than the first image distortion d, it is shown that the second image distortion p is too large, and the second image distortion p needs to be reduced. In this case, the second correction parameter k2 needs to be reduced. When the second image distortion p is smaller than the first image distortion d, it is shown that the second image distortion p is too small, and the second image distortion p needs to be increased. In this case, the second correction parameter k2 needs to be increased. In some embodiments, when the second correction parameter k2 is adjusted, the second correction parameter k2 is changed continuously in the adjustment process.

In the embodiments of the present disclosure, the first correction parameter k1 is updated in real time according to the acquired distorted correction image displayed on the transflective component 50, and thus the driving information image may be corrected in real time, so that a better viewing effect may be obtained.

Figure 3A:
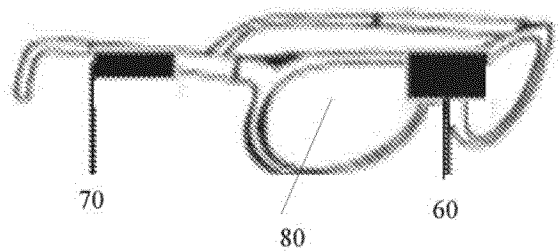
Figure 3B:
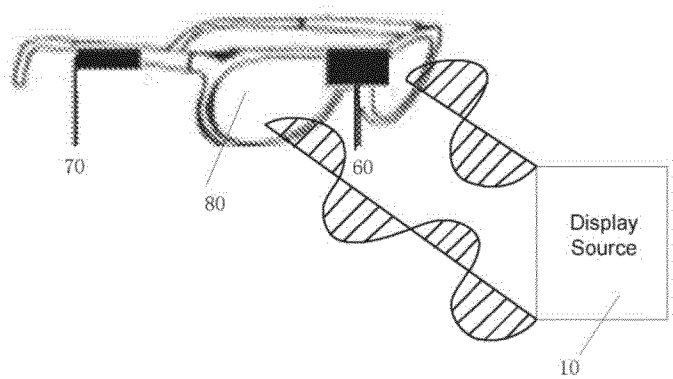
Figure 3C:
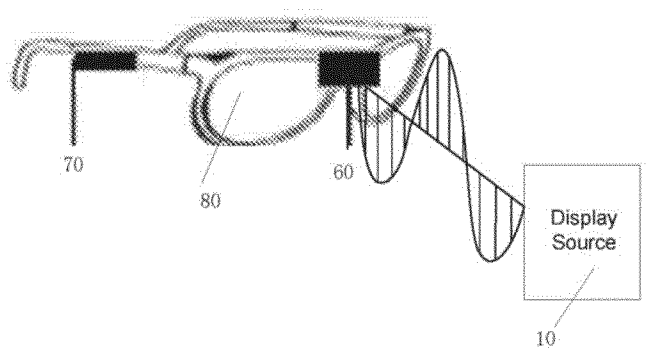
Figure 4:
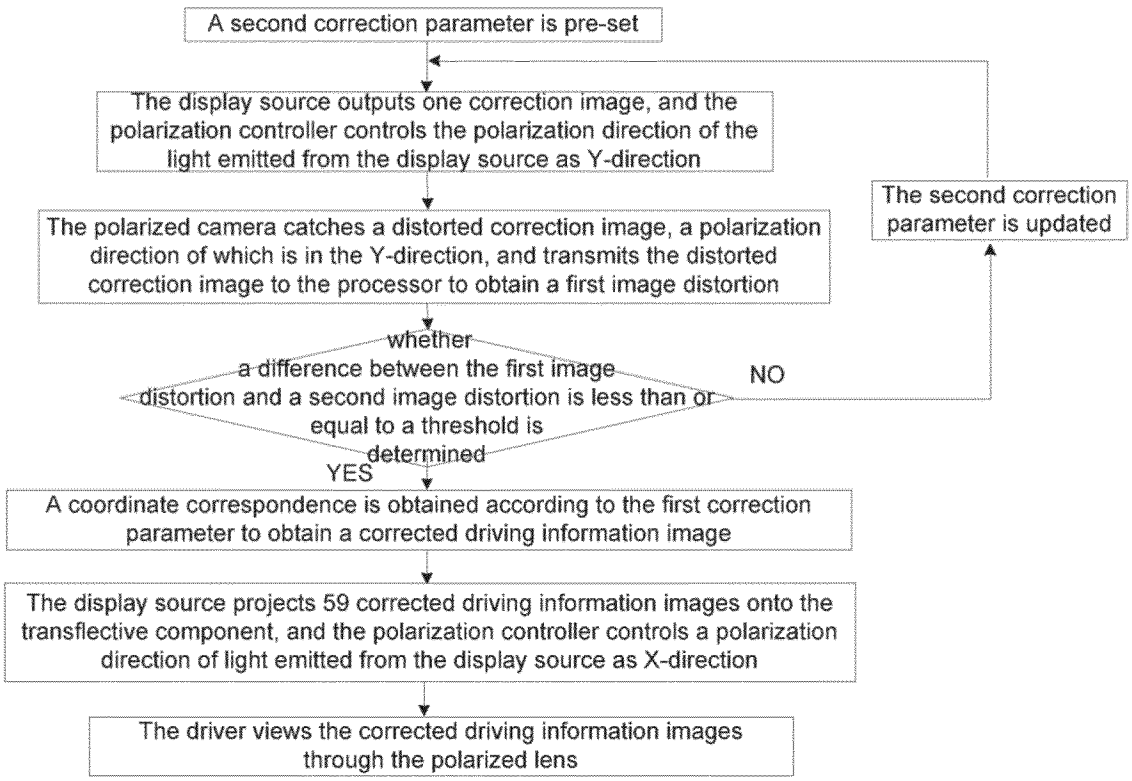
Figure 5:
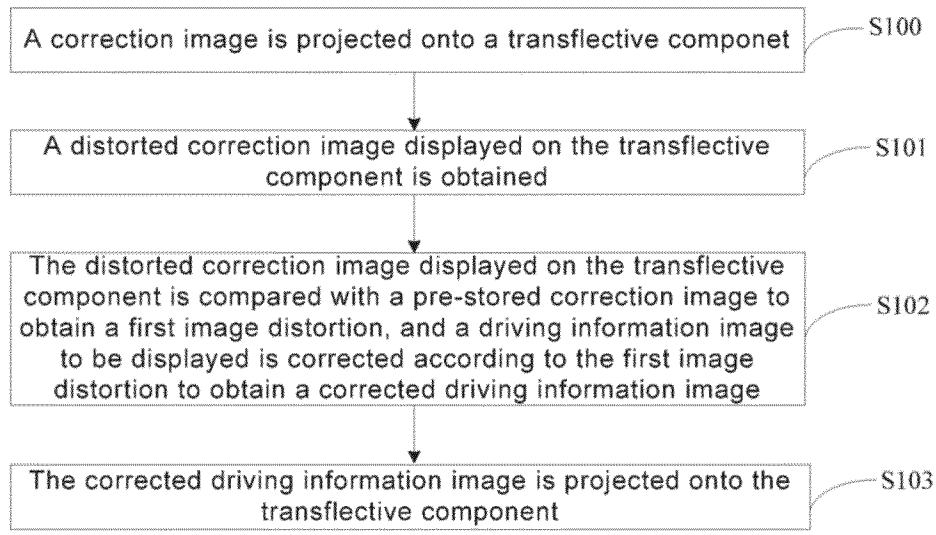
Figure 6:
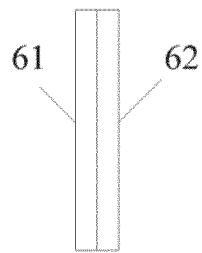

Some embodiments of the present disclosure provide a head up display system, which includes a wearable device 02 as shown in FIG. 3(a) and a head up display 01 as shown in FIG. 1. The wearable device 02 includes a polarized camera 60, a transmitter 70 and at least one polarized lens 80. A polarized transmissive axis of the polarized camera 60 is perpendicular to a polarized transmissive axis of each of the at least one polarized lens 80. The polarized camera 60 is configured to acquire a distorted correction image displayed on the transflective component 50. The transmitter 70 is configured to transmit the distorted correction image acquired by the polarized camera 60 to the receiver 30 of the head up display 01. The polarization controller 20 in the head up display 01 is configured to control a polarization direction of light emitted from the display source 10 to be parallel to the polarized transmissive axis of the polarized lens 80 when the display source 10 projects the driving information image, and to control the polarization direction of light emitted from the display source 10 to be parallel to the polarized transmissive axis of the polarized camera 60 when the display source 10 projects the correction image.

The type of the wearable device 02 is not limited. In some embodiments, the wearable device 02 is a helmet or a pair of glasses.

Figure 6:
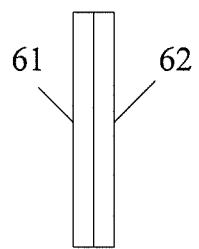
FIG. 6 is a partial structure diagram of a polarized camera provided by some embodiments of the present disclosure.
Figure 1:
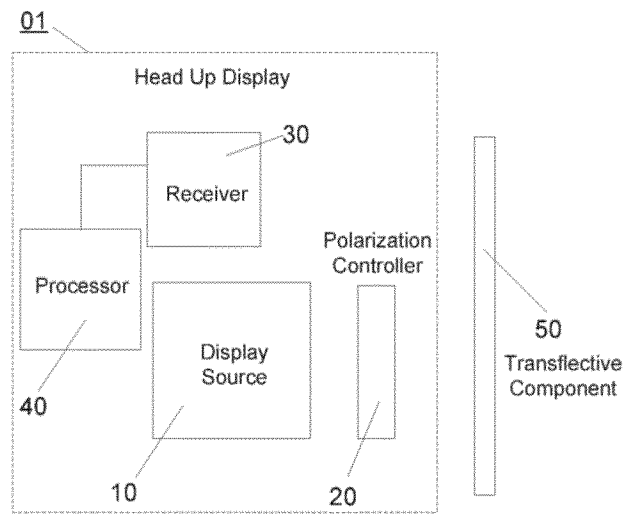
Figure 2A:
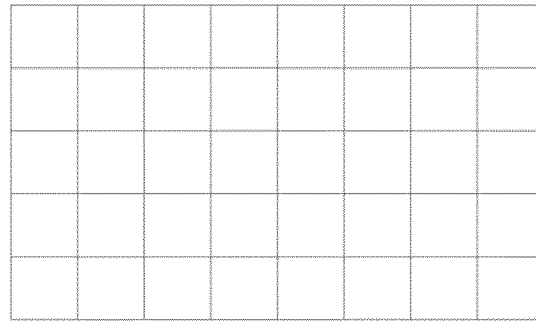
Figure 2B:
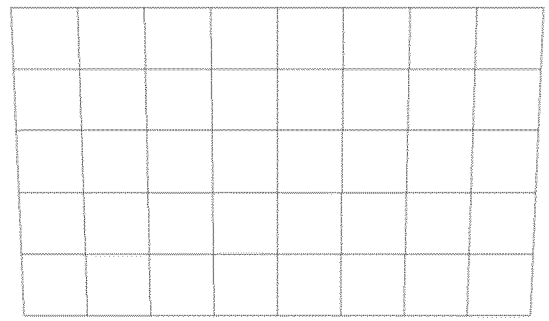
Figure 2C:
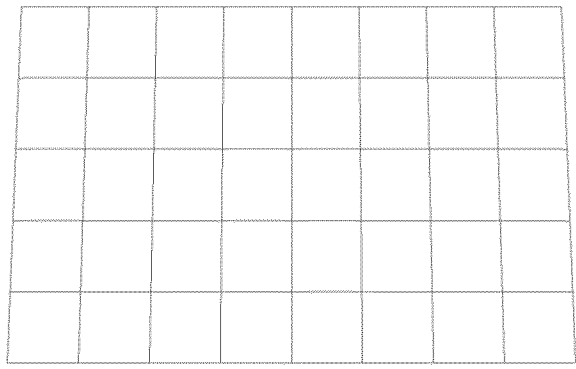
Figure 2D:
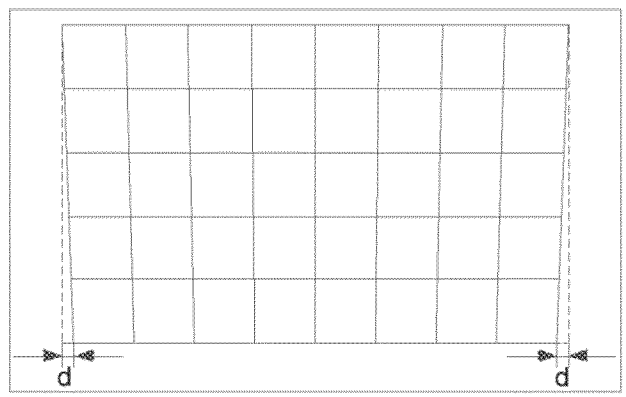
FIG. 2(d) is a diagram of the transflective component with the correction image projected onto the transflective component and the first image distortion d.
Figure 2E:
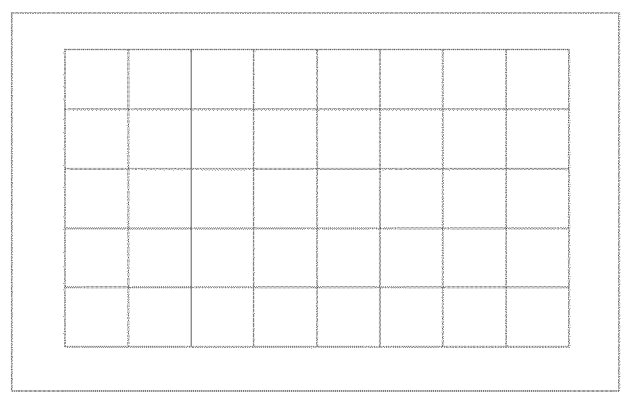
FIG. 2(e) is a diagram of the transflective component with the corrected driving information image projected onto the transflective component.

The polarized camera 60 is a camera which can acquire light which has a certain polarization direction. The structure of the polarized camera 60 is not limited. In some embodiments, as shown in FIG. 6, the polarized camera 60 comprises a camera lens 61 and a polarizer 62 affixed on the camera lens 61. In some embodiments, the camera lens is a camera lens of a traditionally ordinary camera, and after the polarizer is affixed on the camera lens, the polarized camera 60 only obtains a polarized light, a polarization direction of which is parallel to the direction of the polarized transmissive axis of the polarized camera 60. In some other embodiments, the polarized camera includes a camera lens, and an outermost lens, which is used to acquire an image, of the camera lens is a polarizer. In this way, the polarized camera 60 also only obtains a polarized light which has a polarization direction paralleling to the direction of the polarized transmissive axis of the polarized camera 60.

In some embodiments, the transmitter 70 is a wireless WIFI transmitter. The wireless WIFI transmitter may make a device have a beautiful shape, and a transmission line can be omitted. In some other embodiments, the transmitter 70 is a wired transmitter.

In some embodiments, the transmitter 70 is integrated with the polarized camera 60. In some other embodiments, the transmitter 70 is provided individually as shown in FIG. 3(a).

The position of the polarized camera 60 is not limited. As the polarized camera 60 is used to acquire the distorted correction image displayed on the transflective component 50, and the distorted correction image is used to correct the driving information image, in some embodiments, a position and a placement angle of the polarized camera 60 where the distorted correction image is acquired are the same or similar to the position of the driver and the viewing angle for the driving information image where the driver sees the driving information image, respectively. In this way, the driving information image may be corrected precisely, and it may be ensured that the corrected driving information image is distortionless. Based on this, in some embodiments of the present disclosure, as shown in FIG. 3(a), the at least one polarized lenses comprises two polarized lenses, and the polarized camera 60 is provided in an intermediate location between the two polarized lens 80. In this way, the angle and position of the polarized camera 60 where it acquires the correction image displayed on the transflective component 50 are the same as the viewing angle and position of the driver where the driver sees the driving information image displayed on the transflective component 50 through the polarized lens 80, respectively, and then it may be ensured that the correction of the driving information image is more accurate.

The polarization controller 20 is used to control the polarization direction of the light emitted from the display source 10 to be parallel to the polarized transmissive axis of the polarized lens 80 when the display source 10 projects the driving information image, so the driving information image projected onto the transflective component 50 by the display source 10 can enter human eyes through the polarized lens 80. The polarization controller 20 is also used to control the polarization direction of the light emitted from the display source 10 to be parallel to the polarized transmissive axis of the polarized camera 60 when the display source 10 projects the correction image, so the correction image projected onto the transflective component 50 by the display source 10 can be acquired by the polarized camera 60.

In the head up display provided in the embodiments of the present disclosure, the display source 10 of the head up display projects the correction image and the corrected driving information image onto the transflective component 50 at different times, and the polarization controller 20 controls a polarization direction of light emitted from the display source 10. In addition, the polarization controller 20 controls the polarization direction of the light emitted from the display source 10 to be parallel to the polarized transmissive axis of the polarized camera when display source 10 projects the correction image onto the transflective component 50. As the polarized transmissive axis is perpendicular to the polarized transmissive axis of the polarized lens 80, only the polarized camera 60 can obtain a distorted correction image displayed on the transflective component 50. In turn, the polarized camera 60 transmits the acquired distorted correction image to the transmitter 70, and the transmitter 70 transmits the acquired distorted correction image to the receiver 30. Then the receiver 30 transmits the received distorted correction image to the processor 40, and the processor 40 compares the received distorted correction image with the reference image pre-stored in the processor 40 to obtain a first image distortion. Furthermore, the processor 40 corrects the driving information image to be displayed according to the first image distortion to obtain a corrected driving information image.

When the display source 10 projects the driving information image, the polarization controller 20 controls the polarization direction of light emitted from the display source 10 to be parallel to the polarized transmissive axis of the polarized lens 80, so the driver can see the driving information image through the polarized lens 80. In addition, as the driving information image has been corrected, the corrected driving information image seen by the driver is a distortionless image, and then the viewing effect may not be affected.

An example is provided in the following to describe the work process of the head up display system in detail.

Figure 4:
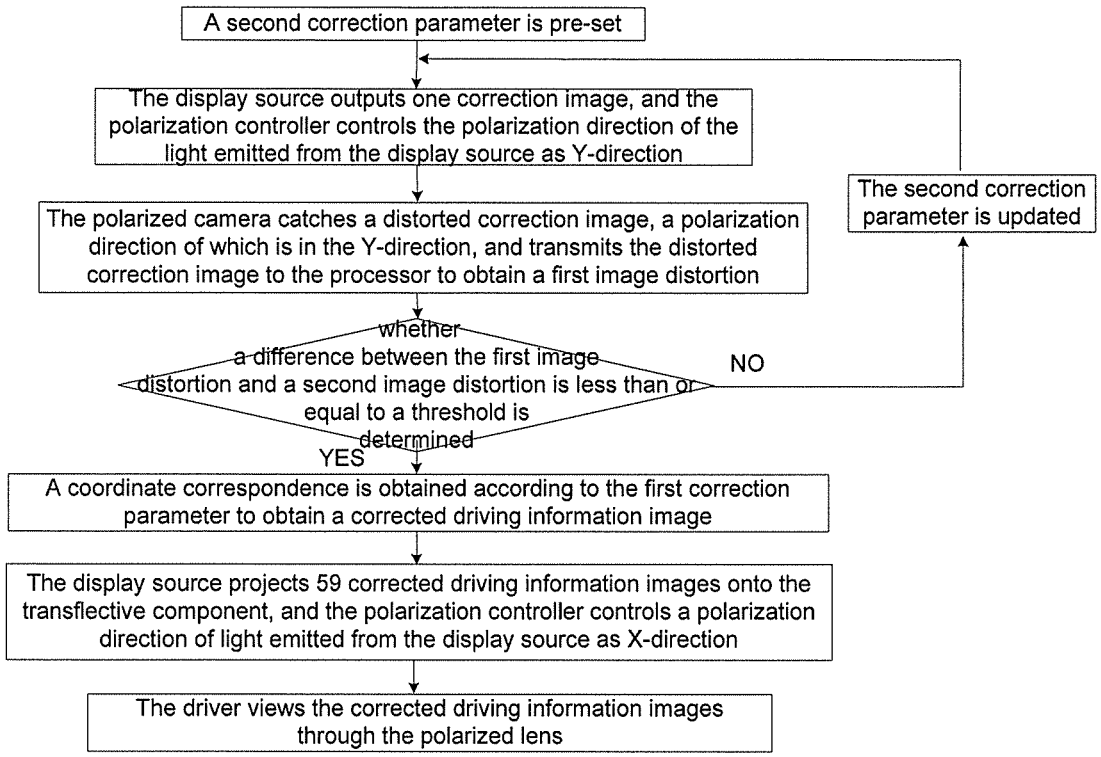
FIG. 4 is a flow diagram of a working process of a head up display system provided by some embodiments of the present disclosure.

As shown in FIG. 4, the processor 40 is initialized, and a second correction parameter k2 is pre-set. In addition, the processor 40 obtains a second image distortion p according to the second correction parameter k2. Then the display source 10 outputs one correction image onto the transflective component 50, while the polarization controller 20 controls the polarization direction of light emitted from the display source 10 as Y-direction, so that a polarization direction of the correction image is in the Y-direction. As the polarized transmissive axis of the polarized camera 60 is in the Y-direction, the polarized camera 60 catches a distorted correction image displayed on the transflective component 50, and transmits the distorted correction image to the receiver 30. In turn, the receiver 30 transmits the received distorted correction image to the processor 40, and then the processor 40 compares the received distorted correction image with the pre-stored correction image to obtain a first image distortion d. Next, according to whether the absolute value of the difference between the first image distortion d and the second image distortion p is less than or equal to a threshold, the processor 40 obtains the first correction parameter k1 directly through the second correction parameter k2 or by adjusting the second correction parameter k2 through a feedback, and updates the first correction parameter k1 when the first image distortion d is changed. Then the processor 40 obtains the coordinate correspondence according to the first correction parameter k1, and the coordinate correspondence is used to indicate a second coordinate (x', y') corresponding to a first coordinate (x, y). Next, the processor 40 obtains the corrected driving information image by adjusting a pixel value at the first coordinate (x, y) in the driving information image to be displayed into a pixel value at the second coordinate (x', y'). The display source 10 projects fifty-nine corrected driving information images, while the polarization controller 20 controls the polarization direction of the light emitted from the display source 10 as X-direction, so that the polarization directions of the fifty-nine corrected driving information images are in the X—direction. As the polarization direction of the polarized lens worn by the driver is the X-direction, the driver can see the corrected driving information image displayed on the transflective component 50.

Some embodiments of the present disclosure provide a car which includes the head up display system described in the above embodiments of the present disclosure.

Here, it will be noted that the head up display system can be set in a car with any model or brand.

Figure 5:
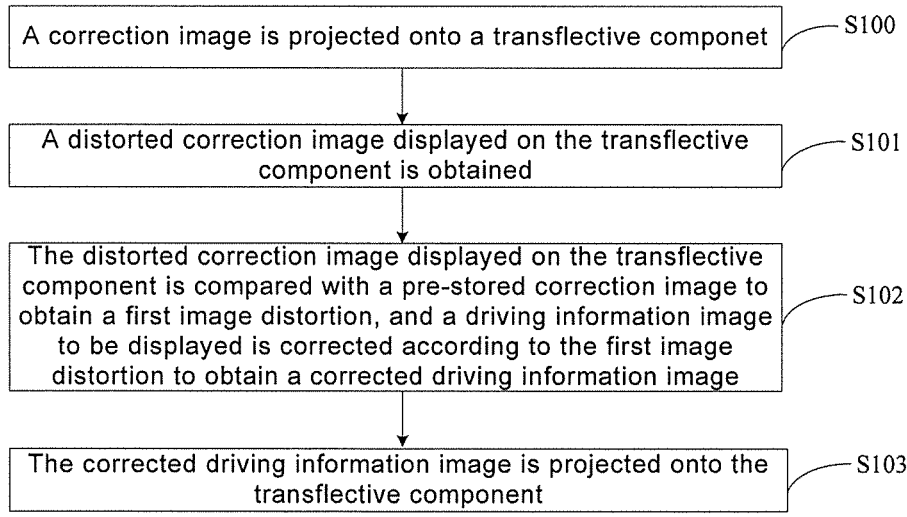
FIG. 5 is a flow diagram of a display method of a head up display or a head up display system provided by some embodiments of the present disclosure.

Some embodiments of the present disclosure provide a display method of a head up display or a head up display system. As shown in FIG. 5, the display method includes steps 100-103 (S100-S103).

In step 100 (S100), a correction image is projected onto the transflective component 50.

The correction image is not limited. In some embodiments, the correction image is an arbitrary image, such as, a landscape painting or a grid image. In some other embodiments, the correction image is a correction grid image.

In some embodiments, a transflective component 50 is a front windshield of a car or an aircraft. In some other embodiments, the transflective component 50 is a projection plank that comes with the head up display.

In step 101 (S101), a distorted correction image displayed on the transflective component 50 is acquired.

In some embodiments, the distorted correction image displayed on the transflective component 50 is acquired by using a polarized camera.

In step 102 (S102), the acquired distorted correction image displayed on the transflective component 50 is compared with a reference image pre-stored to obtain a first image distortion d, and a driving information image to be displayed is corrected according to the first image distortion d to obtain a corrected driving information image.

The first image distortion d is not limited. In some embodiments, the first image distortion is an average value of offsets of pixel points in the distorted correction image displayed on the transflective component 50 relative to corresponding pixel points in the reference image pre-stored in a row direction. In some other embodiments, the first image distortion d is a maximum value of offsets of pixel points in the distorted correction image displayed on the transflective component relative to corresponding pixel points in the reference image pre-stored in a row direction. In this manner, it may be ensured that the distortion of the corrected driving information image is as small as possible.

In step 103 (S103), the corrected driving information image is projected onto the transflective component 50.

The time interval between a time point when the correction image is projected to the transflective component 50 and a time point when the corrected driving information image is projected to the transflective component 50 is not limited, and is subject to that the viewing for the driving information image is not affected and the driving information image is corrected. In some embodiments of the present disclosure, the display source 10 projects images at N frames per second, N–1 images of which is the driving information images and one image is the correction image.

In the display method of a head up display or a head up display system provided in the embodiment of the present disclosure, the display source 10 projects the correction image and the corrected driving information image to the transflective component 50 at different times, and the polarization controller 20 controls a polarization direction of light emitted from the display source 10. In addition, the polarization controller 20 controls the polarization direction of the light emitted from the display source 10 to be parallel to the polarized transmissive axis of the polarized camera 60 when the display source 10 projects the correction image onto the transflective component 50. As the polarized transmissive axis of the polarized camera 60 is perpendicular to the polarized transmissive axis of the polarized lens 80, only the polarized camera 60 can obtain a distorted correction image displayed on the transflective component 50. In turn, the polarized camera 60 transmits the acquired distorted correction image to the transmitter 70, and the transmitter 70 transmits the acquired distorted correction image to the receiver 30 of the head up display. Then the receiver 30 transmits the received distorted correction image to the processor 40, and the processor 40 compares the received distorted correction image with the reference image pre-stored in the processor 40 to obtain a first image distortion. Furthermore, the processor 40 corrects the driving information image to be displayed according to the first image distortion to obtain a corrected driving information image.

When the display source 10 projects the driving information image, the polarization controller 20 controls the polarization direction of light emitted from the display source 10 to be parallel to the polarized transmissive axis of the polarized lens 80, so the driver can see the driving information image through the polarized lens 80. In addition, as the driving information image has been corrected, the corrected driving information image seen by the driver is a distortionless image, and then the viewing effect may not be affected.

In some embodiments of the pressure disclosure, the method of correcting the driving information image to be displayed according to the first image distortion d to obtain the corrected driving information image includes steps 200-201 (S200-S201).

In step 200 (S200), a first correction parameter $k_1$ corresponding to the first image distortion d is obtained, and a coordinate correspondence is obtained according to the first correction parameter $k_1$. The coordinate correspondence is used to indicate a second coordinate (x', y') corresponding to a first coordinate (x, y), and the first coordinate (x, y) is a coordinate of any pixel point in a driving information image to be displayed, where $$x' = \frac{x}{1+k_1 y}(1+k_1 y_{max}),$$

y'=y, and $y_{max}$ is a height of the driving information image to be displayed.

In some embodiments, the first correction parameter $k_1$ corresponding to the first image distortion d is pre-stored in the processor 40. After the first image distortion d is obtained, the corresponding first correction parameter $k_1$ is found according to the first image distortion d. In some other embodiments, after the first image distortion d is obtained, the first correction parameter $k_1$ corresponding to the first image distortion d is calculated according to the first image distortion d, and the method for calculating the first correction parameter is not limited.

It will be noted that the second coordinate (x', y') corresponding to the first coordinate (x, y) of each pixel point in the driving information image to be displayed can be calculated according to the formulas $$x' = \frac{x}{1+k_1 y}(1+k_1 y_{max})$$

and y'=y. For example, the second coordinate corresponding to the pixel point at the first coordinate (1, 2) is calculated to be (1, 3) according to the calculation formulas.

In step 201 (S201), a pixel value at the first coordinate (x, y) in the driving information image to be displayed is adjusted into a pixel value at the second coordinate (x', y') to obtain the corrected driving information image.

For example, the second coordinate corresponding to the pixel point of the first coordinate (2, 2) is (2, 3), the pixel value of the pixel point at the coordinate (2, 2) in the driving information image to be displayed is changed to that of the pixel point at the coordinate (2, 3).

In the embodiments of the present disclosure, a first correction parameter $k_1$ corresponding to the first image distortion d is obtained, and a coordinate correspondence is obtained according to the first correction parameter $k_1$. In addition, a second coordinate (x', y') corresponding to a first coordinate (x, y) of any pixel point in the driving information image can be obtained according to the coordinate correspondence, and then the corrected driving information image can be obtained by adjusting the pixel value at the first coordinate (x, y) in the driving information image to be displayed into a pixel value at the second coordinate (x', y').

In some embodiments of the present disclosure, obtaining the first correction parameter $k_1$ corresponding to the first image distortion d includes steps 300-302 (S300-S302).

In step 300 (S300), an abscissa correspondence is obtained according to a second correction parameter k2. The abscissa correspondence is used to indicate a second abscissa x" corresponding to the first abscissa x, and the first abscissa x is an abscissa of any pixel point in the driving information image to be displayed:

$$x'' = \frac{x}{1+k_2 y}(1+k_2 y_{max}).$$

It will be noted that the second abscissa x" corresponding to the abscissa of any pixel point in the driving information image to be displayed can be obtained according to the formula.

In step 301 (S301), a second image distortion p is obtained according to the first abscissa x and the second abscissa x".

In some embodiments, the second image distortion p is an average value of the absolute values of the differences between the first abscissas x of pixel points in the driving information image to be displayed and the second abscissas x" corresponding to the first abscissas x. In some other embodiments, the second image distortion p is a maximum value of the absolute values of the differences between the first abscissas x of pixel points in the driving information image to be displayed and the second abscissas x" corresponding to the first abscissas x, that is, p=max{Ix-x"I}. In this manner, it may be ensured that the distortion of the corrected driving information image is as small as possible.

As the first image distortion d needs to be compared with the second image distortion p, in some embodiments, if the first image distortion d is an average of offsets of pixel points in the distorted correction image displayed on the transflective component 50 relative to corresponding pixel points in the reference image pre-stored in a row direction, the second image distortion p is an average value of the absolute values of the differences between the first abscissas x of pixel points in the driving information image to be displayed and the second abscissas x" corresponding to the first abscissas x. In addition, if the first image distortion d is a maximum value of offsets of pixel points in the distorted correction image displayed on the transflective component 50 relative to corresponding pixel points in the reference image pre-stored in a row direction, the second image distortion p is a maximum value of the absolute values of the differences between the first abscissas x of pixel points in the driving information image to be displayed and the second abscissas x" corresponding to the first abscissas x.

In step 302 (S302), if the absolute value of the difference between the first image distortion d and the second image distortion p is less than or equal to a threshold, the first correction parameter $k_1$ is set to equal the second correction parameter $k_2$, otherwise, the second correction parameter $k_2$ is adjusted, and the process is returned to execute S300.

The threshold is not limited. In some embodiments, the threshold is an arbitrary number. In some other embodiments, the threshold is zero. When the threshold is equal to zero, namely, the difference between the first image distortion d and the second image distortion p is equal to zero, the first correction parameter k1 is equal to the second correction parameter k2, and if the threshold is not equal to zero, the second correction parameter k2 is adjusted as an adjusted second correction parameter, and the processor is returned to execute the abscissa correspondence according to the adjusted second correction parameter k2.

Here, the situation that the first correction parameter k1 is set to equal the second correction parameter k2 if the absolute value of the difference between the first image distortion d and the second image distortion p is less than or equal to the threshold includes at least three situations, which are the same as the above situations described above and not described again.

It will be noted that as the larger the value of the second correction parameter k2, the larger the second image distortion p, in some embodiments, the second correction parameter k2 is adjusted through a feedback according to the difference between the first image distortion d and the second image distortion p, when the second image distortion p is larger than the first image distortion d, it is shown that the second image distortion p is too large, and the second image distortion p needs to be reduced. In this case, the second correction parameter k2 needs to be reduced. When the second image distortion p is smaller than the first image distortion d, it is shown that the second image distortion p is too small, and the second image distortion p needs to be increased. In this case, the second correction parameter k2 needs to be increased. In some embodiments, when the second correction parameter k2 is adjusted, the second correction parameter k2 is changed continuously in the adjustment process.

The first correction parameter $k_1$ is updated in real time according to the acquired distorted correction image displayed on the transflective component 50, and thus the driving information image is corrected in real time, thereby obtaining a better viewing effect.

The foregoing is merely the embodiments of the present disclosure, but the protection scope of the present disclosure is not limited thereto. In the technical scope of the present disclosure, various changes and modifications which can be easily thought by those skilled in the art shall fall into the protection scope of the present disclosure. Therefore, the protection scope of the present disclosure should be subject to the protection scope of the claims.

What is claimed is:

1. A head up display, comprising:
   a display source configured to project a correction image and a corrected driving information image onto a transflective component at different times;
   a polarization controller configured to control a polarization direction of light emitted from the display source, wherein the polarization controller is configured to:
   control the polarization direction of light emitted from the display source as a first polarization direction while the display source projects the correction image onto the transflective component; and
   control the polarization direction of light emitted from the display source as a second polarization direction while the display source projects the corrected driving information image onto the transflective component, wherein, the first polarization direction is perpendicular to the second polarization direction;
   a receiver configured to receive a distorted correction image displayed on the transflective component; and
   a processor configured to compare the distorted correction image received by the receiver with a reference image pre-stored in the processor to obtain a first image distortion, and to correct a driving information image according to the first image distortion to obtain the corrected driving information image.

2. The head up display according to claim 1, wherein the correction image is a grid image, and the reference image pre-stored is a grid image.

3. The head up display according to claim 1, wherein, the correction image includes a plurality of images and the corrected driving information image includes a plurality of images, wherein,
the display source is configured to project images at N frames per second, wherein, images of N 1 frames are corrected driving information images, and an image of a remaining frame is the correction image, where N is an integer greater than 1.

4. The head up display according to claim 1, wherein, the first image distortion is a maximum value of offsets of pixel points in the distorted correction image displayed on the transflective component relative to corresponding pixel points in the reference image pre-stored in a row direction.

5. The head up display according to claim 1, wherein, the processor is configured to:
obtain a first correction parameter $k_1$ corresponding to the first image distortion;
obtain a coordinate correspondence according to the first correction parameter $k_1$, wherein, the coordinate correspondence is used to indicate a second coordinate (x', y') which is corresponding to a first coordinate (x, y), the first coordinate (x, y) is a coordinate of any pixel point $$x' = \frac{x}{1+k_1 y}(1+k_1 y_{max}),$$

in the driving information image, y'=y, and $y_{max}$ is a height of the driving information image; and
adjust a pixel value at the first coordinate (x, y) in the driving information image into a pixel value at the second coordinate (x', y') to obtain the corrected driving information image.

6. The head up display according to claim 5, wherein, the processor is configured to:
obtain an abscissa correspondence according to a second correction parameter $k_2$, wherein, the abscissa correspondence is used to indicate a second abscissa x" which is corresponding to a first abscissa x, the first abscissa x is an abscissa of any pixel point in the driving information $$x'' = \frac{x}{1+k_2 y}(1+k_2 y_{max});$$

image, obtain a second image distortion according to the first abscissa x and the second abscissa x";
set the first correction parameter $k_1$ to equal the second correction parameter $k_2$ if a difference between the first image distortion and the second image distortion is less than or equal to a threshold; and
adjust the second correction parameter $k_2$ as an adjusted second correction parameter, and return to obtain the abscissa correspondence according to the adjusted second correction parameter if the difference between the first image distortion and the second image distortion is greater than the threshold.

7. A head up display system comprising a wearable device and the head up display according to claim 1, wherein,
the wearable device comprises a polarized camera, a transmitter and at least one polarized lens, a polarized transmissive axis of the polarized camera is perpendicular to a polarized transmissive axis of each of the at least one polarized lens, the polarized camera is configured to acquire a distorted correction image displayed on a transflective component, and the transmitter is configured to transmit the distorted correction image acquired by the polarized camera to a receiver of the head up display,
and wherein, in the head up display, a polarization controller is configured to:
control a polarization direction of light emitted from a display source to be parallel to the polarized transmissive axis of each of the at least one the polarized lens when the display source projects a driving information image; and
control a polarization direction of light emitted from the display source to be parallel to the polarized transmissive axis of the polarized camera when the display source projects the correction image.

8. The head up display system according to claim 7, wherein, the polarized camera comprises a camera lens and a polarizer affixed to the camera lens.

9. The head up display system according to claim 7, wherein, the polarized camera comprises a camera lens, and an outermost lens, which is used to acquire an image, of the camera lens is a polarizer.

10. The head up display system according to claim 7, wherein, the at least one polarized lenses comprises two polarized lenses, and the polarized camera is located in an intermediate location between the two polarized lenses.

11. A display method of the head up display according to claim 1, comprising:
projecting the correction image onto a transflective component, wherein the polarization controller is configured to control the polarization direction of light emitted from the display source as the first polarization direction;
acquiring a distorted correction image displayed on the transflective component;
comparing the distorted correction image displayed on the transflective component and required with the reference image pre-stored, to obtain a first image distortion;
correcting a driving information image according to the first image distortion to obtain the corrected driving information image; and
projecting the corrected driving information image onto the transflective component, wherein the polarization controller is configured to control the polarization direction of light emitted from the display source as the second polarization direction, wherein, the first polarization direction is perpendicular to the second polarization direction.

12. The display method according to claim 11, wherein, the first image distortion is a maximum value of offsets of pixel points in the distorted correction image displayed on the transflective component relative to corresponding pixel points in the reference image pre-stored in a row direction.

13. The display method according to claim 11, wherein, correcting the driving information image according to the first image distortion to obtain the corrected driving information image, comprising:
obtaining a first correction parameter $k_1$ corresponding to the first image distortion;
obtaining a coordinate correspondence according to the first correction parameter $k_1$, wherein, the coordinate correspondence is used to indicate a second coordinate (x', y') which is corresponding to a first coordinate (x, y), the first coordinate (x, y) is a coordinate of any pixel point $$x' = \frac{x}{1+k_1 y}(1 + k_1 y_{max}),$$

in the driving information image, y'=y, and $y_{max}$ is a height of the driving information image; and adjusting a pixel value at the first coordinate (x, y) in the driving information image into a pixel value at the second coordinate (x', y') to obtain the corrected driving information image.

14. The display method according to claim 13, wherein, obtaining the first correction parameter $k_1$ corresponding to the first image distortion, comprising:

obtaining an abscissa correspondence according to a second correction parameter $k_2$, wherein, the abscissa correspondence is used to indicate a second abscissa x" which is corresponding to a first abscissa x, the first abscissa x is an abscissa of any pixel point in the driving $$x'' = \frac{x}{1+k_2 y}(1 + k_2 y_{max});$$

information image, obtaining a second image distortion according to the first abscissa x and the second abscissa X";

setting the first correction parameter $k_1$ to equal the second correction parameter $k_2$ if a difference between the first image distortion and the second image distortion is less than or equal to a threshold; and adjusting the second correction parameter $k_2$ as an adjusted second correction parameter and returning to obtain the abscissa correspondence according to the adjusted second correction parameter if the difference between the first image distortion and the second image distortion is greater than the threshold.

\* \* \* \* \*

UNITED STATES PATENT AND TRADEMARK OFFICE
CERTIFICATE OF CORRECTION

| | | |
|---|---|---|
| PATENT NO. | : 10,825,151 B2 | Page 1 of 8 |
| APPLICATION NO. | : 15/939110 | |
| DATED | : November 3, 2020 | |
| INVENTOR(S) | : Xitong Ma et al. | |

It is certified that error appears in the above-identified patent and that said Letters Patent is hereby corrected as shown below:

On the Title Page

Under ABSTRACT, "14 Claims, 4 Drawing Sheets" should read: --14 Claims, 5 Drawing Sheets-- as seen on attachment.

In the Drawings

Please replace "Drawing Sheets 1-4" with --drawing sheets 1-5-- as seen on attachment.

In the Claims

Column 19, Lines 1-9, should read:
3. The head up display according to claim 1, wherein, the correction image includes a plurality of images and the corrected driving information image includes a plurality of images, wherein,
    the display source is configured to project images at N frames per second, wherein, images of N-1 frames are corrected driving information images, and image is the correction image, where N is an integer greater than 1.

Column 19, Lines 15-35, should read:
5. The head up display according to claim 1, wherein, the processor is configured to: obtain a first correction parameter $k_1$ corresponding to the first image distortion; obtain a coordinate correspondence according to the first correction parameter $k_1$, wherein, the coordinate correspondence is used to indicate a second coordinate (x', y') which is corresponding to a first coordinate (x, y), the first coordinate (x, y) is a coordinate of any pixel point in the driving information image, $$x' = \frac{x}{1+k_1 y}(1+k_1 y_{max}),$$

y'=y, and $y_{max}$ is a height of the driving information image; and adjust a pixel value at the first coordinate (x, y) in the driving information image into a pixel value at the second coordinate (x', y') to obtain the corrected driving information image.

Signed and Sealed this
Twentieth Day of September, 2022

*Katherine Kelly Vidal*

Katherine Kelly Vidal
*Director of the United States Patent and Trademark Office*

Column 20, Lines 59-Column 21, Lines 1-15, should read:

13. The display method according to claim 12, wherein, correcting the driving information image according to the first image distortion to obtain the corrected driving information image, comprising: obtaining a first correction parameter $k_1$ corresponding to the first image distortion; obtaining a coordinate correspondence according to the first correction parameter $k_1$, wherein, the coordinate correspondence is used to indicate a second coordinate (x', y') which is corresponding to a first coordinate (x, y), the first coordinate (x, y) is a coordinate of any pixel point in the driving information image, $$x' = \frac{x}{1+k_1 y}(1+k_1 y_{max})$$

y'=y, and $y_{max}$ is a height of the driving information image; and adjusting a pixel value at the first coordinate (x, y) in the driving information image into a pixel value at the second coordinate (x', y') to obtain the corrected driving information image.

(12) United States Patent
Ma et al.

(10) Patent No.: US 10,825,151 B2
(45) Date of Patent: Nov. 3, 2020

(54) HEAD UP DISPLAY, DISPLAY METHOD THEREOF AND HEAD UP DISPLAY SYSTEM

(71) Applicant: BOE TECHNOLOGY GROUP CO., LTD., Beijing (CN)

(72) Inventors: Xitong Ma, Beijing (CN); Naifu Wu, Beijing (CN); Xiangyang Liu, Beijing (CN); Rui Sun, Beijing (CN); Lihua Geng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 306 days.

(21) Appl. No.: 15/939,110

(22) Filed: Mar. 28, 2018

(65) Prior Publication Data
US 2019/0096043 A1    Mar. 28, 2019

(30) Foreign Application Priority Data

Sep. 27, 2017 (CN) .......................... 2017 1 0890975

(51) Int. Cl.
*H04N 9/31* (2006.01)
*G02B 27/01* (2006.01)
(Continued)

(52) U.S. Cl.
CPC .......... *G06T 5/006* (2013.01); *G02B 27/0172* (2013.01); *G02B 27/286* (2013.01);
(Continued)

(58) Field of Classification Search
CPC .............................................. G02B 2027/0141
See application file for complete search history.

(56) References Cited

U.S. PATENT DOCUMENTS

2012/0224062 A1* 9/2012 Lacoste ................. G06F 3/147
                                                                  348/148
2016/0363764 A1* 12/2016 Ting ......................... G02B 5/30
(Continued)

FOREIGN PATENT DOCUMENTS

CN    105700136 A    6/2016
CN    105791786 A    7/2016
(Continued)

OTHER PUBLICATIONS

English translation of CN-105791786-A (Year: 2016).*
Office Action issued in corresponding Chinese Patent Application No. 201710890975.X, dated May 22, 2019.

*Primary Examiner* — Alison Slater
(74) *Attorney, Agent, or Firm* — Michael E. Fogarty

(57) ABSTRACT

A head up display includes: a display source configured to project a correction image and a corrected driving information image onto a transflective component; a polarization controller configured to control a polarization direction of light emitted from the display source; a receiver configured to receive a distorted correction image displayed on the transflective component; and a processor connected with the receiver, and configured to compare the distorted correction image received by the receiver with a correction image pre-stored in the processor to obtain a first image distortion, and to correct a driving information image to be displayed according to the first image distortion to obtain the corrected driving information image.

14 Claims, 5 Drawing Sheets

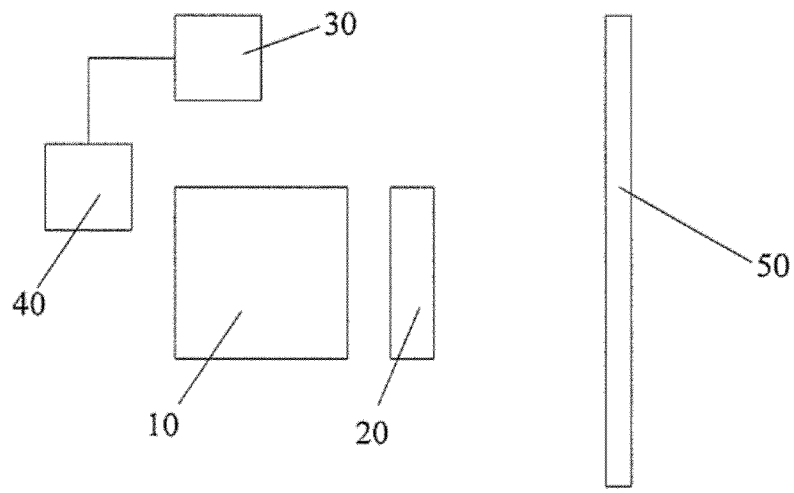

Transflective Component

Transflective Component